Figure 1:
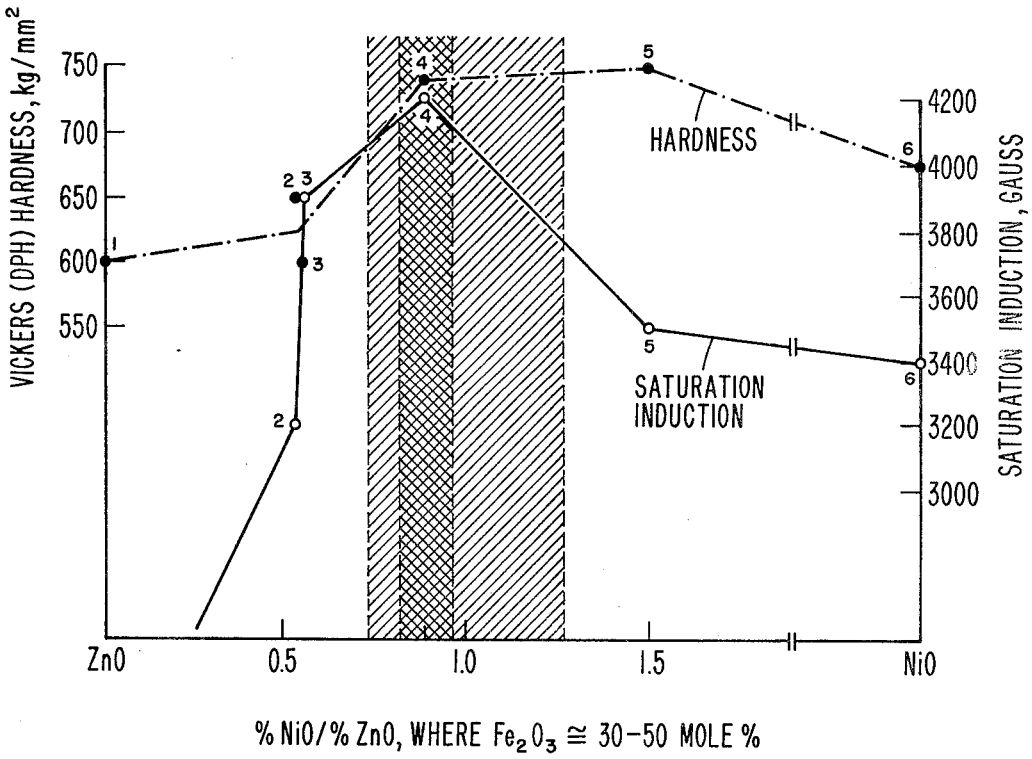
Figure 2:
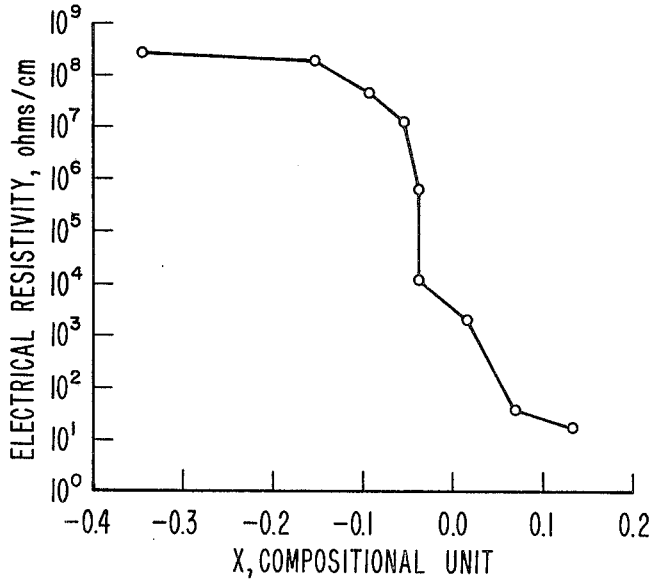
Figure 3:
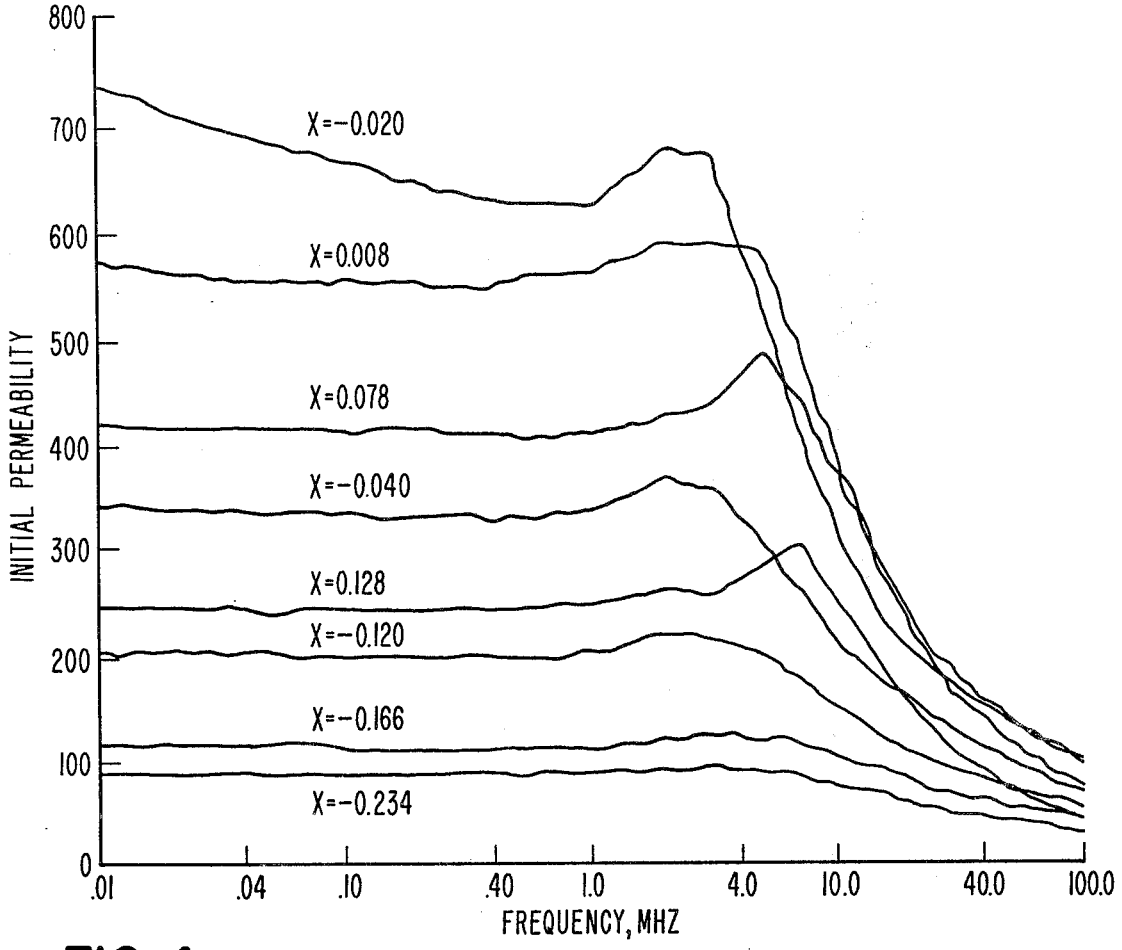
Figure 4:
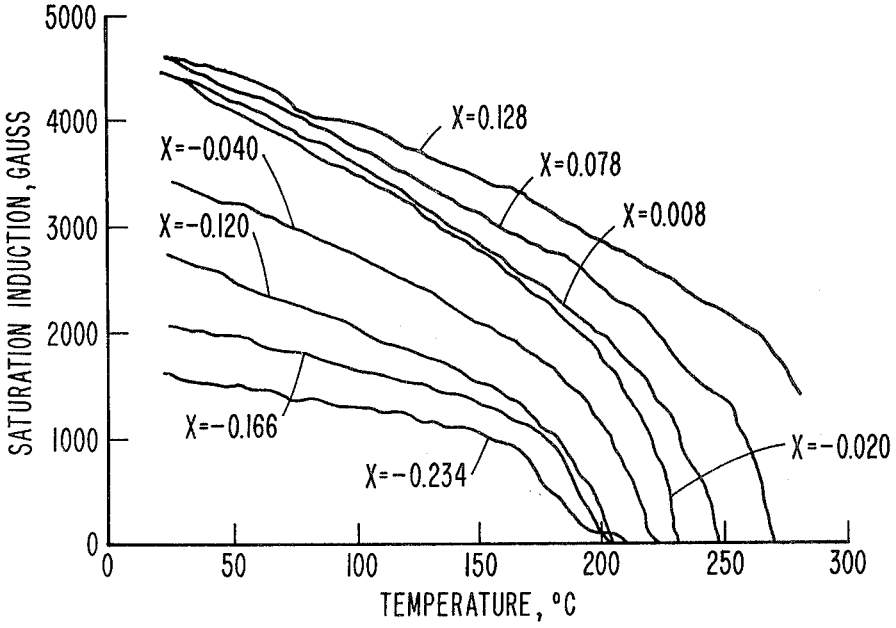

United States Defensive Publication [19] (H) [11] T976,003

Kehr et al. [43] Nov. 7, 1978

[54] WEAR RESISTANT NICKEL-ZINC FERRITE

[76] Inventors: William D. Kehr, 7155 Mt. Sherman Rd., Longmont, Colo. 80501; Harold L. Turk, 1623 Puerto Vallarta, San Jose, Calif. 95120

[21] Appl. No.: 852,992

[22] Filed: Nov. 18, 1977

[51] Int. Cl.[2] ..... C04B 35/30

[52] U.S. Cl. ..... 252/62.62

[57] ABSTRACT

A nickel-zinc ferrite material suitable for use in magnetic heads is disclosed. The material has a general empirical formula $$(N_{1-y}Zn_y)_{1-x}Fe_{2+x}O_{3.99}$$

wherein $x$ is less than 0 and greater than $-0.040$, $y$ is from about 0.44 to about 0.58, and wherein the ratio of %NiO/%ZnO is from about 0.72 to about 1.27, and wherein the mole percent of NiO is from about 21.5 to about 28.5%, and the mole percent ZnO is from about 22.5 to about 29.5%, and the mole percent $Fe_2O_3$ is from about 48 to about 50%. More specific composition ranges as well as a preferred composition are also disclosed.

3 Claims, 2 Sheets Drawing,

10 Pages Specification

The file of this unexamined application may be inspected and copies thereof may be purchased (849 O.G. 1221, Apr. 9, 1968).